(12) United States Patent
Schmid

(10) Patent No.: US 9,183,483 B2
(45) Date of Patent: Nov. 10, 2015

(54) CAN

(71) Applicant: SEIBERSDORF LABOR GMBH, Seibersdorf (AT)

(72) Inventor: Gernot Schmid, Bromberg (AT)

(73) Assignee: Seibersdorff Labor GmbH, Seibersdorf (AT)

( * ) Notice: Subject to any disclaimer, the term of this patent is extended or adjusted under 35 U.S.C. 154(b) by 0 days.

(21) Appl. No.: 14/406,411

(22) PCT Filed: May 17, 2013

(86) PCT No.: PCT/AT2013/050110
§ 371 (c)(1),
(2) Date: Dec. 8, 2014

(87) PCT Pub. No.: WO2013/181680
PCT Pub. Date: Dec. 12, 2013

(65) Prior Publication Data
US 2015/0129663 A1    May 14, 2015

(30) Foreign Application Priority Data

Jun. 6, 2012 (AT) .................................. A 652/2012
Jul. 19, 2012 (AT) .............................. A 50285/2012

(51) Int. Cl.
*G06K 19/06* (2006.01)
*G08B 13/14* (2006.01)
*H04Q 5/22* (2006.01)
*G06K 19/073* (2006.01)
*B65D 17/00* (2006.01)
*H01Q 1/22* (2006.01)
*G06K 19/04* (2006.01)

(52) U.S. Cl.
CPC .......... *G06K 19/07327* (2013.01); *B65D 17/02* (2013.01); *B65D 17/165* (2013.01); *G06K 19/041* (2013.01); *H01Q 1/2225* (2013.01); *B65D 2203/10* (2013.01)

(58) Field of Classification Search
CPC ................ B65D 51/22; B65D 17/165; G06K 19/07749; G06K 19/07758
USPC ................ 235/492; 340/10.1, 572.1; 220/266
See application file for complete search history.

(56) References Cited

U.S. PATENT DOCUMENTS

| 5,947,256 A | 9/1999 | Patterson |
| 2008/0055089 A1* | 3/2008 | Gustafsson ................. 340/572.1 |
| 2010/0219252 A1* | 9/2010 | Kikuchi et al. ................. 235/488 |
| 2011/0102150 A1 | 5/2011 | Stotbayashi et al. |

FOREIGN PATENT DOCUMENTS

| DE | 10344270 A1 | 4/2005 |
| JP | 2007238138 A | 9/2007 |
| WO | 9832104 A1 | 7/1998 |

* cited by examiner

Primary Examiner — Laura Gudorf
(74) Attorney, Agent, or Firm — Laurence A. Greenberg; Werner H. Stemer; Ralph E. Locher

(57) ABSTRACT

A can contains an electrically conductive body and a closure region being delimited by a predetermined breaking edge on an end wall. The can has an opening element that lies in a planar fashion in its home position against the end wall and is connected to the end wall at at least one location. The opening element pivots with respect to the can from the home position into an opening position and the closure region becomes detached and an opening for emptying the content of the can is formed in the intermediate region bounded by the predetermined breaking edge. The opening element has a carrier body made of electrically and/or magnetically insulating material. The opening element has an antenna arranged on or in the carrier body and a transponder chip connected to the antenna. The home position of the antenna is disposed in the vicinity of the can.

20 Claims, 6 Drawing Sheets

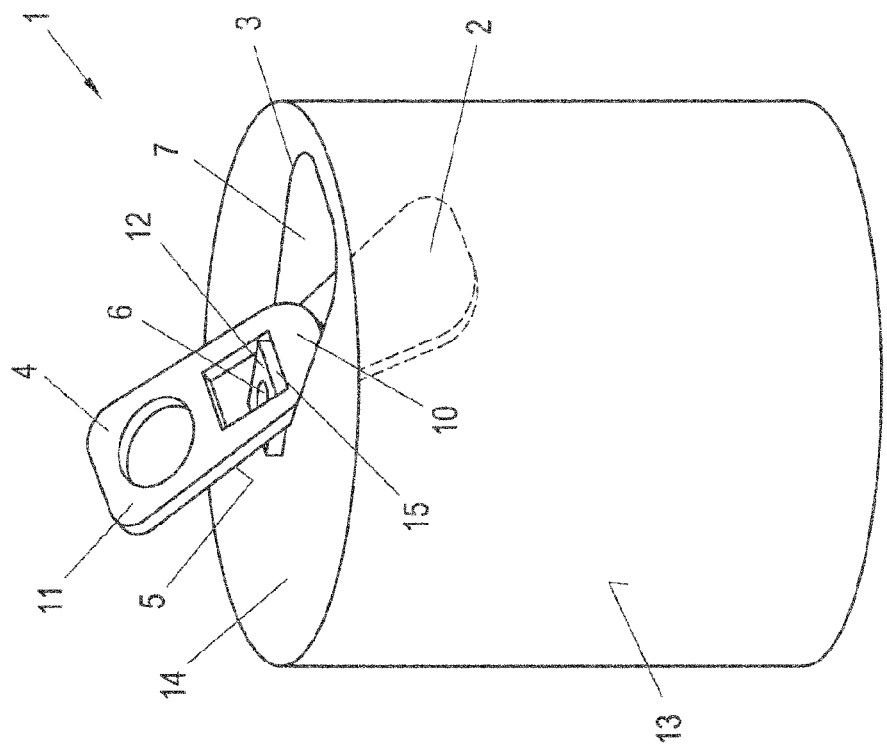
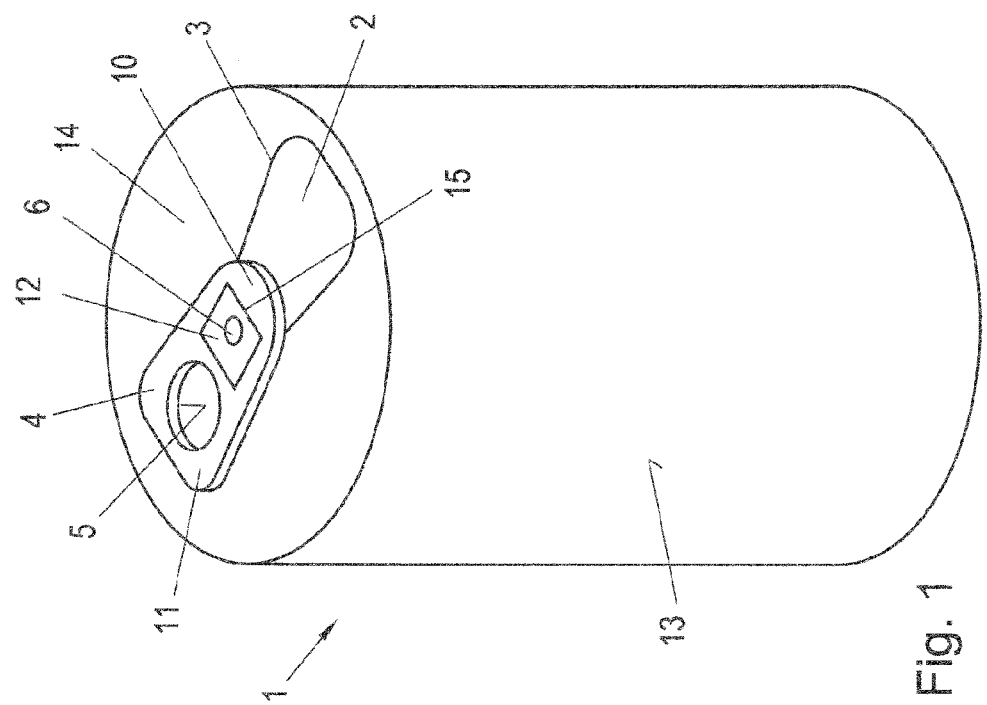

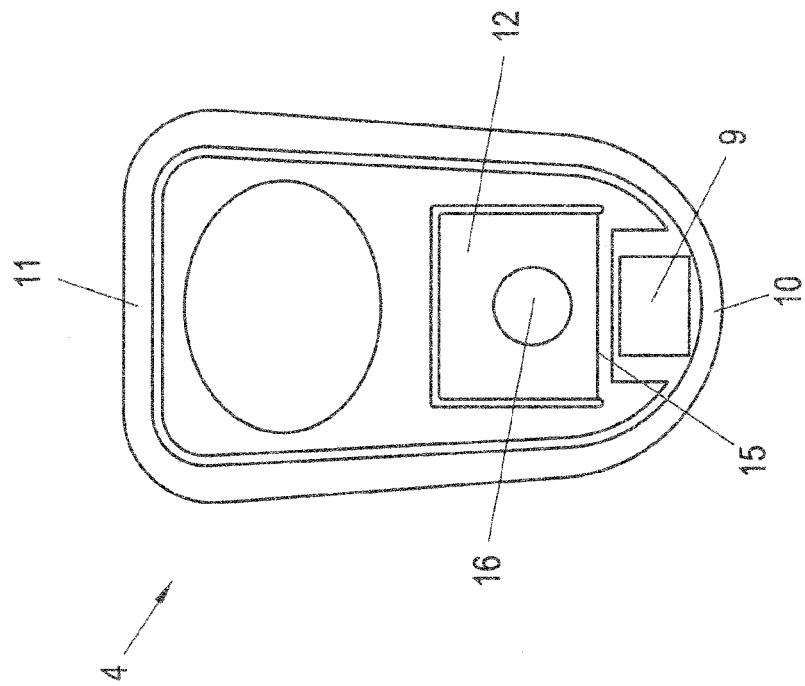
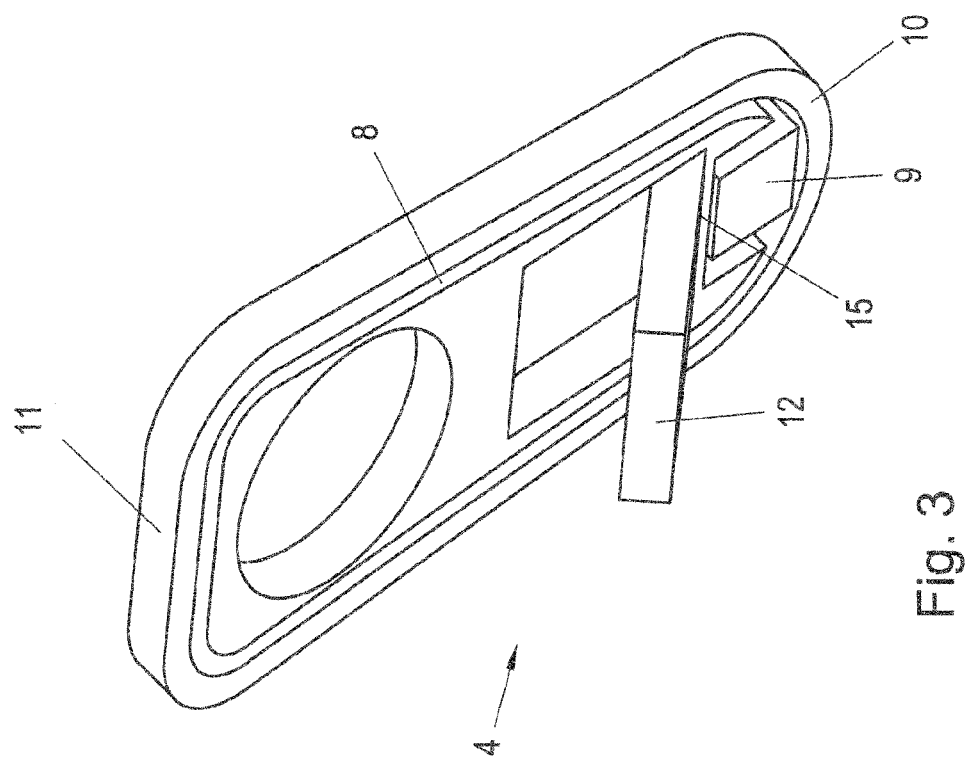

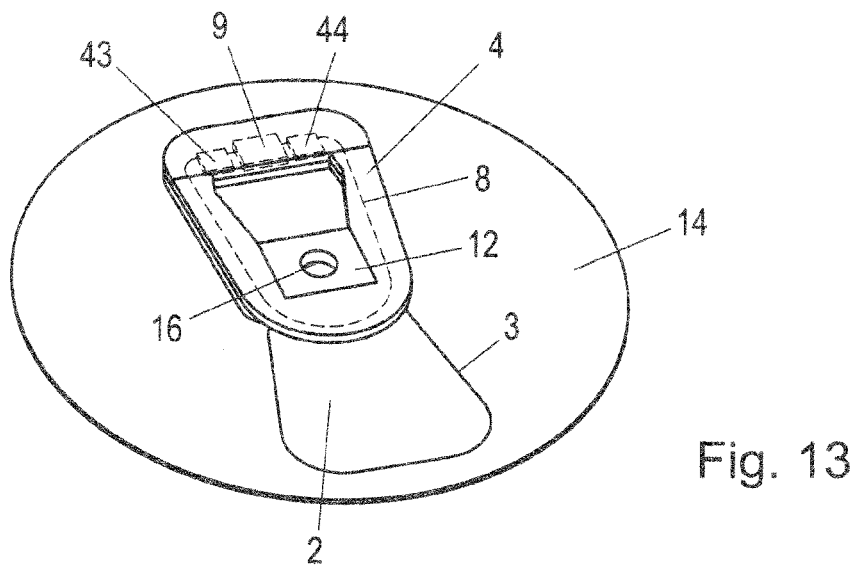
Fig. 13
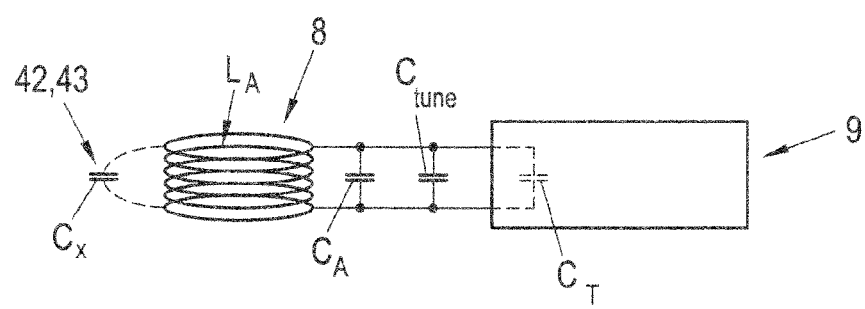
Fig. 14
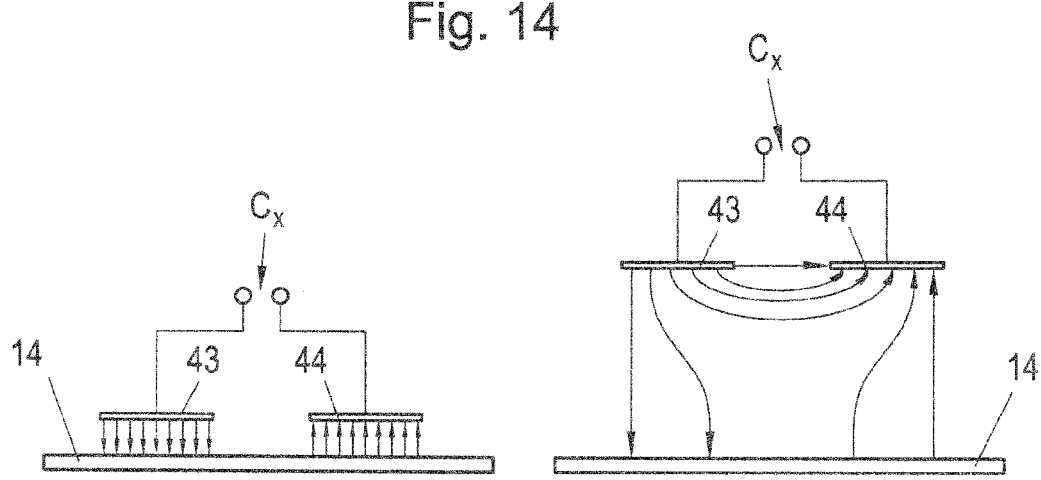
Fig. 15
Fig. 16

CAN

BACKGROUND OF THE INVENTION

Field of the Invention

This invention relates to a can according to the independent claim.

From prior art, a plurality of beverage cans are known which can be opened by means of a single-use closure, wherein the opening will respectively break off a closing region from the body of the can so that the contents of the can be poured out.

According to prior art, it is also possible for RFID/NFC antennae and RFID/NFC transponders to be arranged on objects, in particular also on cans, in order to transmit data stored in the transponder to an external communication device by means of the external data communication device.

However, from prior art, no possibility is known for data to be transmissible from a container to an external data communication device only if a single-use closure of the container has been opened. E.g., such a device could be used for giving access to some information stored inside the transponder only to the person who has purchased the respective can or the respective container. Typically, such a can to be used advantageously for sweepstakes where it is required for each participant to have bought or opened the can.

BRIEF SUMMARY OF THE INVENTION

It is thus an object of the invention to provide a can wherein data are transmissible from a transponder arranged on the can to an external data communication device not until the respective can has been opened, and/or an external data communication device may store data on a transponder arranged on the can not until the respective can has been opened.

The invention achieves this object with the can of the type mentioned in the beginning having the feature of the characterizing part of the independent patent claim. According to the invention, in a can comprising an at least partially electrically conductive body, in particular made of aluminum, wherein a closing region is at least partially delimited by a break-off edge on an end wall of the can, and wherein the can has an opening element, wherein the opening element, in the initial position thereof, is at least partially lying flat against the end wall of the can, and is connected to the end wall in at least one location, wherein upon pivoting of the opening element with respect to the can from the initial position to an opening position, the closing region will tear off from the break-off edge, and in the intermediate region delimited by the break-off edge, an opening is created for the contents of the can to be poured out, provision is made for the opening element to have a carrier body made or consisting of an electrically and/or magnetically insulating material, for the opening element to have an antenna arranged on or in the carrier body as well as a transponder chip connected to the antenna, wherein the antenna, in the initial position, is arranged at close range of the can, in particular near the end wall of the can, and for the wall region or surface region of the end wall of the can, to which the opening element is adjacent, to be electrically and/or magnetically conductive.

Herein, it is advantageous for data communication to be possible between the transponder arranged on the can and an external data communication device not until the can has been opened. At any rate, data communication is impossible when the opening element is in the initial position thereof and the can has not yet been opened.

In order for communication between the transponder arranged on the can and an external data communication device to be effectively avoided, provision can be made for the antenna in the initial position to have a maximum spacing of less than 3 mm, in particular less than 0.2 mm, from the wall of the can, and/or for the antenna to be at least partially lying against the can.

For the same purpose, alternatively or in addition, provision can be made for the antenna to be arranged so that in the initial position, electromagnetic fields directed to the antenna are altered by the wall region or surface region of the can so that coupling of electromagnetic fields into the antenna is suppressed or sufficiently attenuated so that no data communication is possible between the transponder arranged on the can and an external data communications device.

In order to allow for communication between an external data communication device and the transponder, provision can be made for the antenna in the opening position to be raised and/or spaced apart from the conductive wall region and surface region of the can, and/or pivoted with respect thereto, and for the antenna in the opening position to receive electromagnetic fields directed thereto in a form and intensity adequate for wireless data communication, and relay them to the transponder chip.

In the opening position, in order to effectively avoid shielding or displacement of electromagnetic waves directed to the antenna, provision can be made for a transmission frequency to be comprised between 100 kHz and 1000 MHz, in particular in the range from 120 to 135 kHz, in the range from 13 to 14 MHz, or in the range from 860 to 910 MHz, and/or for the specific electrical conductivity of the carrier material of the opening element to be less than 1 S/m, and/or for the electrical permittivity of the carrier material of the opening element to be less than $100*8.854*10^{-12}$ As/Vm, and/or for the magnetic permeability of the opening element to be less than $(1+2.2*10^{-5})*4*\pi*10^{-7}$ Vs/Am.

In the initial position, in order to effectively ensure shielding or displacement of electromagnetic waves directed to the antenna, provision can be made at a transmission frequency comprised between 100 kHz and 1000 MHz, in particular in the range from 120 to 135 kHz, in the range from 13 to 14 MHz, or in the range from 860 to 910 MHz, for the wall region or surface region of the can to which the opening element is adjacent to have a specific electrical conductivity of at least 10 S/m, in particular at least $10^6$ S/m, and/or a magnetic permeability of at least $(1+2.2*10^{-5})*4*\pi*10^{-7}$ Vs/Am, in particular at least $0.99*4*\pi*10^{-7}$ Vs/Am.

A particularly easily manufactured embodiment of the invention provides for the closing region and the break-off edge to be made on an end wall of the can.

A particularly advantageous arrangement allowing for advantageous pivoting of the opening element provides for the opening element to be connected to the can via a rivet, wherein the opening element, in the initial position thereof, has a pressure region adjacent to the closing region for the closing region to be pushed down.

For easy opening of the can, provision can be made herein for the opening element to have an actuating region opposite the pressure region, wherein the pressure region and the actuating region are delimited with respect to each other by the rivet and together act like a two-arm lever hinged via the rivet.

A particularly simple mechanical configuration allowing for proper pivoting of the opening element with respect to the can provides for the opening element to have a connecting element pivoting with respect to the body thereof and which can be connected to the wall by means of the rivet.

Particularly simple positioning of the transponder can be achieved in that in the initial position, the transponder chip is arranged in a region of the opening element adjacent to the closing region.

In the use of transmission frequencies ranging from 10 to 15 MHz, it is particularly advantageous for the antenna to be made to be ring-shaped, and in particular to be arranged in a notch along the circumferential edge of the opening element.

A particularly simple construction of an inventive can provides for the antenna and the transponder chip to be arranged on a common film, in particular a common sticker, which is arranged on the opening element, in particular glued onto the opening element.

A design which allows for particularly advantageous manufacturing provides for the opening element to be made in two parts and to have a base part hinged on the end wall, as well as an antenna part connected to the base part and having a body which is not electrically conductive, wherein the transponder chip and the antenna are arranged, in particular integrally cast, in the antenna part, and wherein the base part has at least one projection, in particular two projections, connected and in particularly adjacent to the antenna part.

Herein, provision can be made advantageously for the antenna part to have a casing part and a ring projection, with the antenna extending at least partially in the ring projection, and/or with the casing part having at least one snap-in recess, in particular two snap-in recesses, into which the end of the projection, in particular both ends of the projections, of the base part is/are engaged, in particular snapped in, and/or with the projection(s) of the base part being adjacent to the ring projection of the antenna part.

Additional suppression of communication can be ensured by two plate elements in particular conductively or capacitively coupled to the antenna, which in the initial position thereof, are close to the end wall, and in the opening position are spaced apart from the end wall.

A preferred sample embodiment of the invention will be illustrated more in detail by means of the following figures.

BRIEF DESCRIPTION OF THE SEVERAL VIEWS OF THE DRAWING

FIG. 1 shows an embodiment of the invention in the initial position.

FIG. 2 shows the embodiment of the invention represented in FIG. 1 in the opening position.

FIG. 3 shows the opening element in the opening position in an oblique side view.

FIG. 4 shows the opening element in the initial position in top view.

In FIG. 13, the end wall of a can is represented together with an opening element according to another alternative embodiment of the invention.

FIG. 14 shows an equivalent circuit diagram of the embodiment of the invention represented in FIG. 13.

FIG. 15 shows the course of the electromagnetic field in the closed opening element 4.

FIG. 16 shows the course of the electromagnetic field in the open opening element 4.

DESCRIPTION OF THE INVENTION

Figure 5:
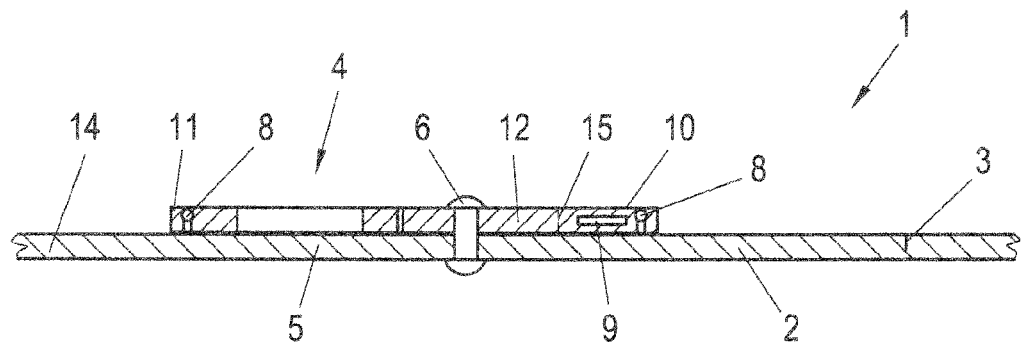
FIG. 5 shows the electromagnetic response of the can as well as the opening element in the initial position.

FIG. 1 represents a cylindrical can 1 according to a preferred sample embodiment of the invention. The body of the can 1 consists entirely of aluminum, wherein the can 1 may have a printed decorative film on the surface area 13 thereof. On the end wall 14 of the can 1, a closing region 2 is provided which is delimited by a break-off edge 3. Furthermore, the can 1 has an opening element 4 connected to the end wall 14 of the can 1 via a rivet 6 passing through a recess 16 (FIG. 3) of the opening element 4. In the present sample embodiment, the body of the can 1 completely consists of aluminum. In principle, however, it is sufficient for the wall region and surface region 5 of the can, to which the opening element 4 is adjacent, to cause an adequate reaction on an electromagnetic field applied from outside, in the area of the opening element 4, so that with the opening element 4 adjacent to the wall region and surface region 5, no wireless electromagnetic data transmission is possible between an antenna 8 arranged in or on the opening element 4 and an external data communication device (FIG. 3). The opening element 4 has a connecting element 12 with recess 16, pivoting with respect to the body thereof, which is connected by means of the rivet 6 to the end wall 14 of the can 1 and which is lying flat against the end wall 14 of the can 1. Usually, the opening element 4 may rotate about the rivet axis of the rivet 6, in the present sample embodiment, there is no motion-rigid connection of the opening element 4 to the can. In the present sample embodiment, the opening element is lying flat against the end wall 14 of the can 1.

FIG. 2 represents the embodiment of the can 1 represented in FIG. 1 in the opening position. In the opening operation, an actuating region 11 of the opening element 4 facing away from the closing region 2 is raised, and the whole opening element 4 is pivoted with respect to the hinge edge 15 between the connecting element 12 and the body of the opening element 4. Thereby, the pressure region 10 of the opening element 4 adjacent to the closing region 2 is pushed towards the closing region 2 towards the inside of the can 1, whereby the closing region 2 will tear off along the break-off edge 3 from the wall end 14 of the can 1, and enter the can 1. Thereby, an opening 7 is created from which the contents of the can 1 can be poured out.

In FIG. 3, the opening element 4 is represented in detail. The opening element 4 has a carrier body made of electrically and magnetically insulating material, wherein on the side of the opening element 4 oriented toward the cover wall 14 a notch is provided extending in a closed ring shape inside the opening element 4. Inside said notch, the wire coils of the antenna 8 which is connected to a transponder chip 9 located in the pressure region 10 of the opening element 4 are extending. Antenna 8 extends along the edge of the lower end wall of the opening element 4 which is oriented towards the cover wall 14 of the can 1. As apparent from FIG. 4, the connecting element 12 of the opening element 4 has a center recess 16 through which the rivet 6 is passed.

In an alternative embodiment, it could also be sufficient for the transponder chip 9 as well as the antenna 8 to be glued onto an adequately shaped sticker on top of the opening element 4.

FIG. 5 shows a cross-section of the can 1 and the opening element 4 as well as the electromagnetic response of the can 1 and the opening element 4 in the initial position. As already mentioned, the antenna 8 is located in a notch inside the body of the opening element 4 on the side oriented towards the end wall 14 of the can 1. In this sample embodiment, the antenna 8 is lying all-over against the end wall 14 of the can. However, this is not mandatory. For the desired effect of a sufficient reaction on the electromagnetic fields directed from an external data communication device to the antenna 8, so that communication is impossible between the external data communication device and the transponder chip 9 via the antenna 8, it is sufficient for the antenna 8 to have a maximum spacing of less than 2 to 3 mm in the initial position. Then, in the initial position, magnetic fields directed to the antenna 8 are sufficiently displaced from the wall region and surface region 5 on the end wall 14 of the can 1, or the electrical properties of the antenna 8 are altered so that communication is impossible between an external data communication device and the transponder chip 9 via the antenna 8. The electrical connection between the transponder chip 9 and the antenna 8 is not represented in FIGS. 5 and 6.

Figure 6:
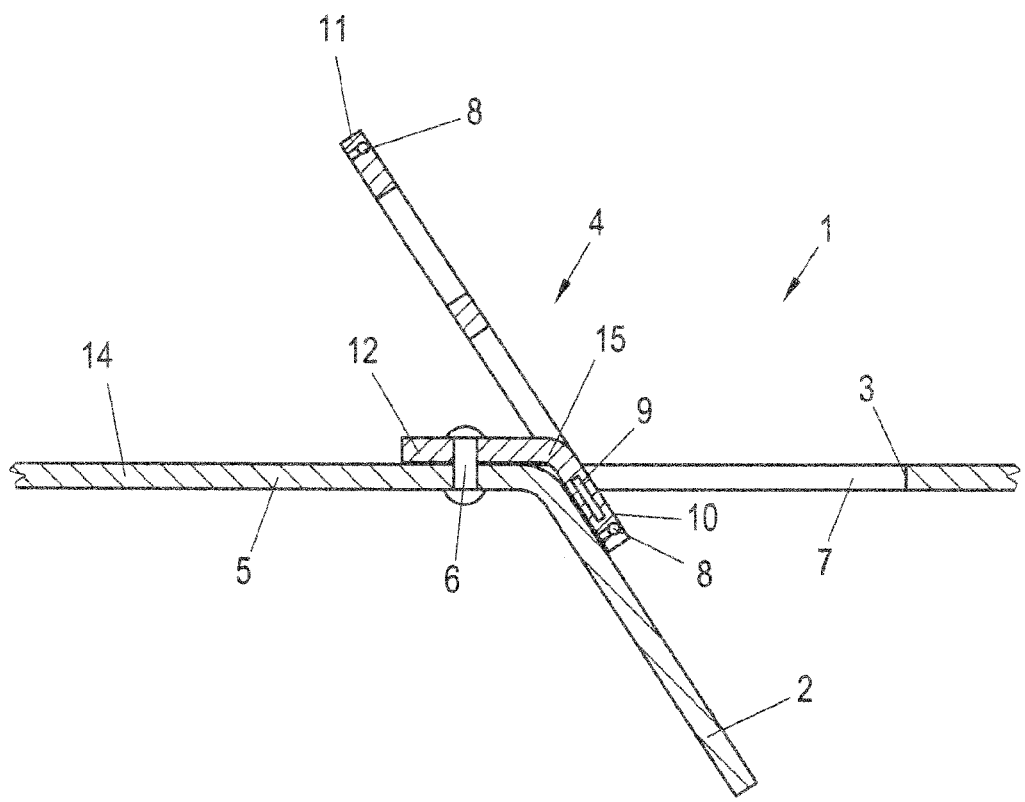
FIG. 6 shows the electromagnetic response of the can as well as the opening element in the opening position.
Figure 7:
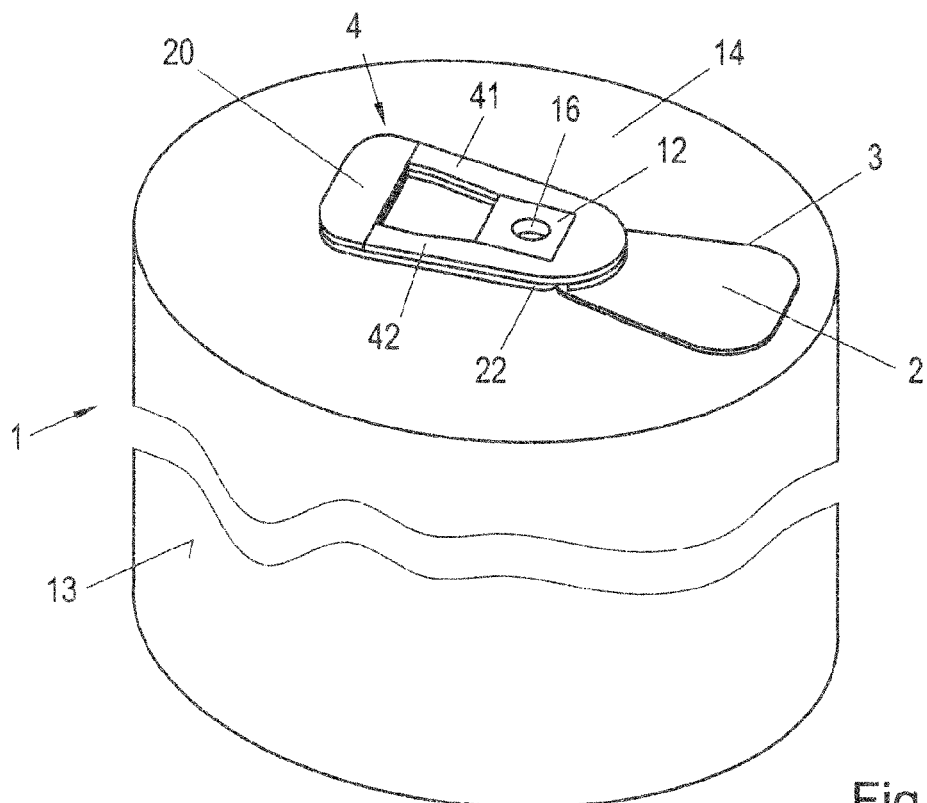
FIG. 7 shows an alternative embodiment of the invention in the initial position.

FIG. 6 shows a cross-section of the can 1 and the opening element 4 as well as the electromagnetic response of the can 1 and the opening element 4 in the opening position. In contrast to the initial position, in the opening position, due to pivoting of the opening element 4 with respect to the end wall 14 of the can 1, in the actuating region 11 of the opening element 4, the antenna 8 is raised from the end wall 14 of the can 1. In this state, the opening element 4 is clearly electromagnetically uncoupled from the wall region and surface region 5. I.e., the reaction caused by the wall region and surface region 5 on the electromagnetic field applied by an external data communication only has a largely attenuated effect on the antenna 8. Thus, electromagnetic energy as well as information can be transmitted by means of electromagnetic fields from an external data communication device to the transponder chip 9 via the antenna 8.

Typically, cans are produced completely made of aluminum or some other metal. However, in the present sample embodiment, this is not a requirement. For the adequate effect of field displacement to be ensured, all that is required is that the wall region and surface region 5 of the can 1 to which the opening element 4 is adjacent is electrically and/or magnetically conductive. In the present sample embodiment, the wall region or surface region 5 of the can 1 to which the opening element 4 is adjacent has an electrical conductivity of at least $10^6$ S/m, in particular at least 10 S/m. In addition, in the wall region and surface region 5 to which the opening element 4 is adjacent, the can 1 has a magnetic permeability of at least $4*\pi*10^{-7}$ Vs/Am, in particular at least $0.99*4*\pi*10^{-7}$ Vs/Am. Aluminum, which is typically employed as a material for the wall region and/or surface region of the can 1, in particular for the whole can 1, has an electrical conductivity of $37*10^6$ S/m and a magnetic permeability of $(1+2.2*10^{-5})*4*\pi*10^{-7}$ Vs/Am.

Moreover, in FIGS. 5 and 6, magnetic field lines B are plotted in order to illustrate the specific case of the magnetic coupling between a magnetic field generated by an external data communication device and the antenna 8.

In the case represented in FIG. 5 with the opening element 4 in the initial position, i.e. the opening element 4 being adjacent to the wall region and surface region 5, in the electrically and/or magnetically conductive wall region and surface region 5, the magnetic field of the external data communication device will generate eddy currents J, which will cause field displacement near the opening element 4 so that the resulting magnetic field passing through the antenna 8 is too small to enable wireless electromagnetic communication between the external data communication device and the transponder chip 9 via the antenna 8.

In the case represented in FIG. 6, with the opening element 4 raised with respect to the wall region and surface region 5, there is sufficient spacing between the antenna 8 and the wall region and surface region 5 so that the field displacement caused by the eddy currents in the wall region and surface region 5 near the wall region and surface region 5 will act upon the antenna 8 only in a very attenuated manner and the antenna 8 is sufficiently penetrated by the magnetic field so that wireless electromagnetic communication is enabled between the external data communication device and the transponder chip 9 via the antenna 8.

In the present sample embodiment, the opening element 4 is made to be electrically and magnetically non-conductive and to have an electrical permeability as well as a magnetic permeability approximately matching the permittivity and permeability of the air. In the present sample embodiment, the specific electrical conductivity of the carrier material of the opening element 4 is very low and is approximately $10^{-2}$ S/m at a transmission frequency of 13.56 MHz typically to be used.

It is particularly advantageous if the specific electrical conductivity of the carrier material of the opening element 4 is less than 10 S/m.

The magnetic permeability of the carrier material of the opening element 4 is preferably less than $1.001*4*\pi*10^{-7}$ Vs/Am, in particular less than $4*\pi*10^{-7}$ Vs/Am. In the present sample embodiment, polypropylene or polyethylene is used as the carrier material of the body of the opening element 4. At a typical transmission frequency of 13.56 MHz, the carrier material has a specific electrical conductivity of about $10^{-3}$ S/m to $10^{-1}$ S/m, an electrical permittivity from about $10^{-3}$ S/m to $10^{-1}$ S/m, an electrical permittivity from about $2*8.854*10^{-12}$ As/Vm to $3*7.854*10^{-12}$ As/Vm, as well as a magnetic permeability of about $4*\pi*10^{-7}$ Vs/Am.

Of course, alternatively, a different transmission frequency, such as from 120 to 135 kHz, or a transmission frequency from 860 to 910 MHz can also be used.

In FIGS. 7 to 12, an alternative sample embodiment of the invention is represented. This sample embodiment of the invention represented in FIGS. 7 to 12 substantially corresponds to the sample embodiment represented in FIGS. 1 to 6, the differences between the individual sample embodiments being discussed below.

Figure 8:
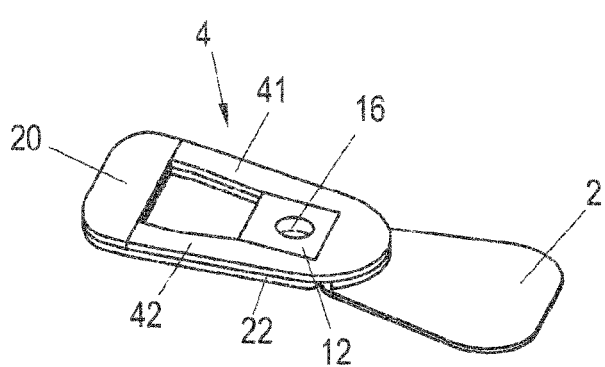
FIG. 8 shows the opening element in the initial position obliquely in an oblique side view.

In the present sample embodiment, the opening element 4, as represented in FIG. 8, is made of two parts and comprises a first antenna part 20 consisting of a non-conductive material, as well as a second base part 40 consisting of a conductive material. The antenna part 20, which in the present special sample embodiment is made of polyethylene, comprises a first casing part 21 into which the transponder chip 9 is embedded or cast. Also, the antenna part 20 comprises an annular projection part 22 starting from the casing part 21 and forming a ring body together with the casing part 2. Inside the ring body, the antenna 8 is arranged, which in the present sample embodiment has three windings. Both ends of the antenna 8 are connected to the transponder chip 9.

Figure 9:
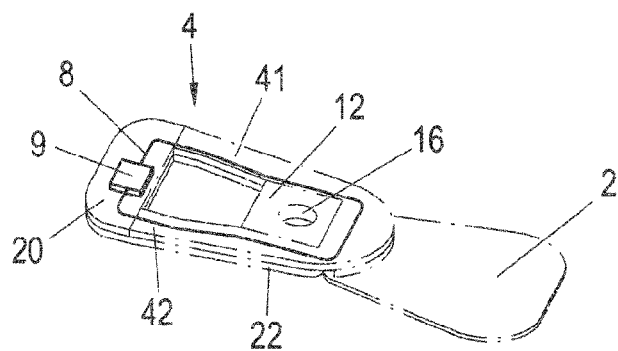
FIG. 9 shows the opening element represented in FIG. 8 in a transparent view.
Figure 10:
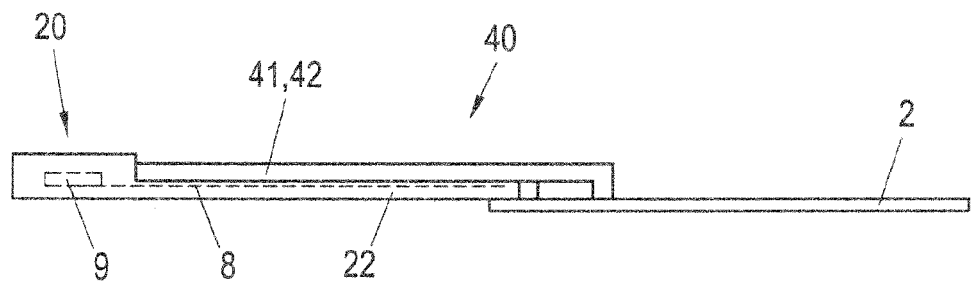
FIG. 10 shows the opening element represented in FIG. 8 in side view.
Figure 11:
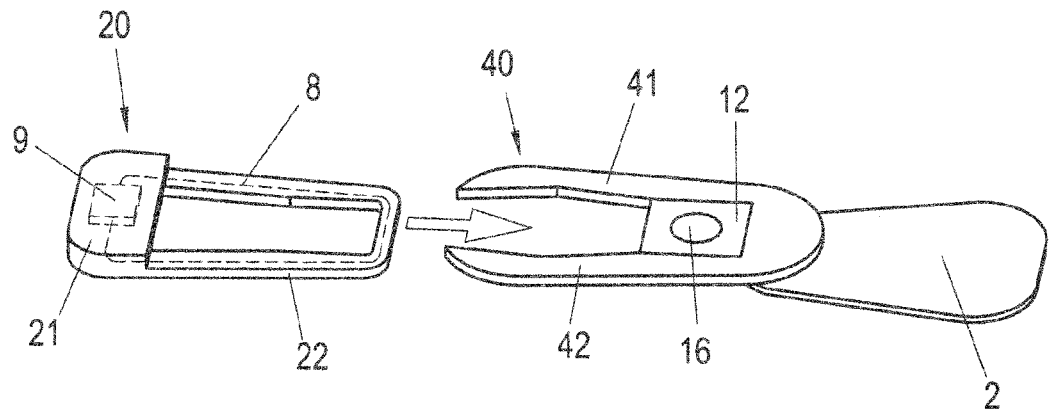
FIG. 11 shows the opening element represented in FIG. 8 during assembly.
Figure 12:
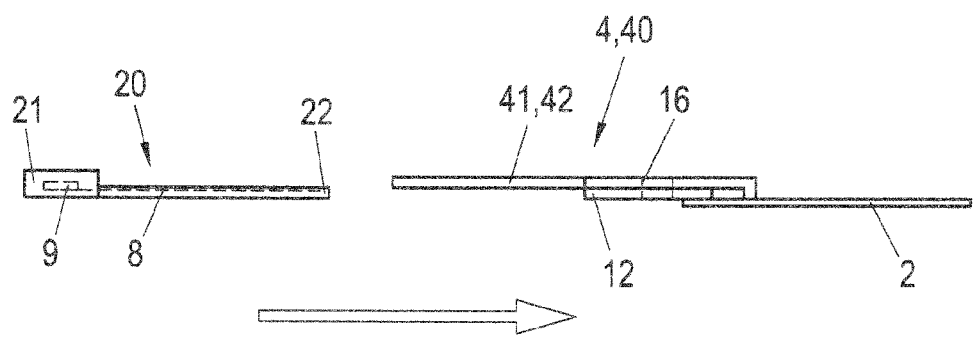
FIG. 12 shows the representation of the assembly of both parts of the opening element in side view.

In this special embodiment of the invention, the base part 40 (FIG. 10) corresponds to the opening element 4 represented in FIGS. 3 and 4, with the difference that instead of the closed course two snap-in projections 41, 42 are protruding towards the antenna part. As represented in FIGS. 9 and 10, said two snap-in projections 41, 42 are adjacent to the ring projection 22 of the antenna part 20. The two front end regions of the snap-in projections 41, 42 engage with openings provided in the casing part 21 of the antenna part 20 thereby establishing a connection between the antenna part 20 and the base part 40 which cannot be detached in a non-destructive manner.

The special constructional configuration of the opening element 4 ensures that the opening element 4 as such will neither shield nor displace electromagnetic waves so that in the closed state, displacement occurs through the metallic end wall 14, but in the open state, a radio link can be established between the transponder 9 and an external data communication device via the antenna 8.

In FIG. 13, another alternative embodiment of the invention is represented, substantially corresponding to one of the two first embodiments of the invention. In addition to the features already represented in the two preceding embodiments, the embodiment represented in FIG. 13 additionally has two conductive and metallic plate elements 43, 44 which are connected to the antenna 8 in the present sample embodiment. The metallic plate elements 43, 44 are arranged in the antenna part 20 respectively next to the transponder chip 9. However, in principle, an alternative arrangement is also possible, wherein the plate elements 43, 44 are to be arranged in a position which in the open state is spaced apart as much as possible from the end wall 14 of the can 1, and in the closed state as close as possible to the end wall 14 of the can 1. In FIG. 14, an equivalent circuit diagram of the electronic components located within the opening element 4 is represented. In principle, adequate power supply of the transponder chip 9 is possible only if the antenna 8 together with all of the components connected thereto is operated in resonance. Assuming a given input capacitance $C_T$ of the transponder chip 9, then the resonant frequency of the arrangement is determined by inductance $L_A$ of antenna 8, capacitance $C_A$ of antenna 8, as well as a possibly existing tuning capacitance $C_{tune}$. Said tuning capacitance $C_{tune}$ is in principle determined so that the oscillation circuit fixed by the previously described inductances $L_A$ and capacitances $C_A$, $C_T$ can be operated in resonance at a previously specified frequency.

In principle, any further occurring capacitance $C_X$ will lead to a shift of the resonant frequency of the oscillation circuit thus created, whereby power transmission to the transponder chip 9 is prevented. In order to achieve additional suppression of the response of the transponder chip 9 when the opening element 4 is closed, in addition to the attenuation of the magnetic coupling described in the preceding sample embodiments, it is thus possible to modify the resonant frequency by introducing an additional capacitance $C_X$ into the oscillation circuit so that the transponder 9 can no longer respond.

In FIG. 15, the oscillation circuit has applied thereto a parallel capacitance $C_X$ which is large at a short distance of the plate width 43, 44 from the end wall 14 of the can 1 and shifts the resonant frequency so that no communication is possible with the transponder 9. By opening the opening element 4, the plate elements 43, 44 are spaced apart from the end wall 14 whereby the capacitance $C_X$ is largely reduced. Thereby, the resonant frequency is shifted back to the original range thereof and communication with the transponder chip is enabled.

The invention claimed is:

1. A can, comprising:
   an at least partially electrically conductive body;
   an end wall having a closing region being at least partially delimited by a break-off edge on said end wall, said end wall supported by said at least partially electrically conductive body;
   an opening element, said opening element, in an initial position is at least partially lying flat against said end wall and connected to said end wall in at least one location, wherein upon pivoting of said opening element with respect to the can from the initial position to an opening position, said closing region will tear off from said break-off edge, and in an intermediate region delimited by said break-off edge, an opening is created for a contents of the can to be poured out, said opening element having a carrier body containing an electrically and/or magnetically insulating material, said opening element further having an antenna disposed on or in said carrier body, and a transponder chip connected to said antenna, wherein said antenna, in the initial position, is disposed close to said end wall;
   said end wall having a surface region to which said opening element is adjacent, is electrically and/or magnetically conductive; and
   two plate elements being conductively or capacitively coupled with said antenna, said two plate elements in the initial position being close to said end wall and in the opening position being spaced apart from said end wall.

2. The can according to claim 1, wherein in the initial position, said antenna has a maximum spacing of less than 3 mm from said end wall, and/or said antenna is at least partially adjacent to said end wall.

3. The can according to claim 1, wherein said antenna is disposed so that in the initial position, electromagnetic fields directed to said antenna are altered by said surface region so that coupling of electromagnetic fields into said antenna is suppressed.

4. The can according to claim 1, wherein in the opening position, said antenna is raised and/or spaced apart from said surface region, and/or pivoted with respect to said surface region, and in that in the opening position, said antenna receives electromagnetic fields directed thereto in a form and intensity adequate for wireless data communication and relays them to said transponder chip.

5. The can according to claim 1, wherein:
   a transmission frequency is comprised in a range between 100 kHz and 1000 MHz; and/or
   a specific electrical conductivity of a carrier material of said opening element is less than 1 S/m; and/or
   an electrical permittivity of said carrier material of said opening element is less than $100*8.854*10^{-12}$ F/m; and/or
   a magnetic permeability of said carrier material of said opening element is less than $1.001*4*\pi*10^{-7}$ H/m.

6. The can according to claim 1, wherein:
   at a transmission frequency comprised in the range between 100 kHz and 1000 MHz said surface region is adjacent to said opening element;
   said surface region has a specific electrical conductivity of at least 10 S/m; and/or
   said surface region has a magnetic permeability of at least $(1+2.2*10^{-5})*4\pi*10^{-7}$ H/m.

7. The can according to claim 1, wherein said closing region and said break-off edge are made on said end wall.

8. The can according to claim 1, further comprising a rivet, said opening element is connected to said end wall via said rivet, wherein said opening element has a pressure region adjacent to said closing region in the initial position thereof for pushing down said closing region.

9. The can according to claim 8, wherein said opening element has an actuating region opposite said pressure region, said pressure region and said actuating region are delimited from each other by said rivet and together act as a two-arm lever hinged by said rivet.

10. The can according to claim 8, wherein said opening element has a connecting element pivoting with respect to said at least partially electrically conductive body and connected to said end wall by means of said rivet.

11. The can according to claim 1, wherein in the initial position, said transponder chip is disposed on said opening element adjacent to said closing region.

12. The can according to claim 1, wherein:
said opening element has a circumferential edge with a notch formed therein; and
said antenna is ring-shaped and disposed in said notch along said circumferential edge of said opening element.

13. The can according to claim 1, wherein said opening element has a common film and said antenna and said transponder chip are disposed on said common film.

14. A can, comprising:
an at least partially electrically conductive body;
an end wall having a closing region being at least partially delimited by a break-off edge on said end wall, said end wall supported by said at least partially electrically conductive body;
an opening element, said opening element, in an initial position is at least partially lying flat against said end wall and connected to said end wall in at least one location, wherein upon pivoting of said opening element with respect to the can from the initial position to an opening position, said closing region will tear off from said break-off edge, and in an intermediate region delimited by said break-off edge, an opening is created for a contents of the can to be poured out, said opening element having a carrier body containing an electrically and/or magnetically insulating material, said opening element further having an antenna disposed on or in said carrier body, and a transponder chip connected to said antenna, wherein said antenna, in the initial position, is disposed close to said end wall;
said end wall having a surface region to which said opening element is adjacent, is electrically and/or magnetically conductive;
said opening element is made of two parts including a base part hinged on said end wall, and an antenna part having an electrically non-conductive body, said transponder chip and said antenna are disposed in said antenna part, and said base part has at least one projection connected and adjacent to said antenna part; and
said antenna part having a casing part and a ring projection, said antenna extending at least partially within said ring projection, and/or said casing part having at least one snap-in recess formed therein with which an end of said projection of said base part engages and/or said projection of said base part is applied to said ring projection of said antenna part.

15. A can, comprising:
an at least partially electrically conductive body;
an end wall having a closing region being at least partially delimited by a break-off edge on said end wall, said end wall supported by said at least partially electrically conductive body;
an opening element, said opening element, in an initial position is at least partially lying flat against said end wall and connected to said end wall in at least one location, wherein upon pivoting of said opening element with respect to the can from the initial position to an opening position, said closing region will tear off from said break-off edge, and in an intermediate region delimited by said break-off edge, an opening is created for a contents of the can to be poured out, said opening element having a carrier body containing an electrically and/or magnetically insulating material, said opening element further having an antenna disposed on or in said carrier body, and a transponder chip connected to said antenna, wherein said antenna, in the initial position, is disposed close to said end wall;
said end wall having a surface region to which said opening element is adjacent, is electrically and/or magnetically conductive;
said opening element is made of two parts including a base part hinged on said end wall, and an antenna part having an electrically non-conductive body, said transponder chip and said antenna are cast in said antenna part, and said base part has at least two projections connected and adjacent to said antenna part; and
said antenna part having a casing part and a ring projection, said antenna extending at least partially within said ring projection, and/or said casing part having at least two snap-in recesses formed therein with which both ends of said projections, of said base part are snapped in, and/or said projections of said base part are applied to said ring projection of said antenna part.

16. The can according to claim 1, wherein said at least partially electrically conductive body is made of aluminum.

17. The can according to claim 2, wherein said antenna has a maximum spacing of less than 0.2 mm from said end wall.

18. The can according to claim 5, wherein the transmission frequency is comprised in a range between 13 to 14 MHz.

19. The can according to claim 6, wherein:
the transmission frequency is comprised in a range between 860 to 910 MHz;
said surface region has a specific electrical conductivity of at least $10^6$ S/m; and
said surface region has a magnetic permeability of at least $0.99*4*\pi*10^{-7}$ H/m.

20. The can according to claim 13, wherein said common film is a common sticker and said antenna and said transponder chip are glued to said opening element.

* * * * *